June 28, 1960
H. P. GRAY
2,942,677
TRACTOR WITH DRIVEN WHEELS INDIVIDUALLY POWERED
AND MOUNTED ON TRANSMISSION HOUSINGS
CONSTITUTING PART OF THE FRAME
Filed Sept. 23, 1957
3 Sheets-Sheet 1
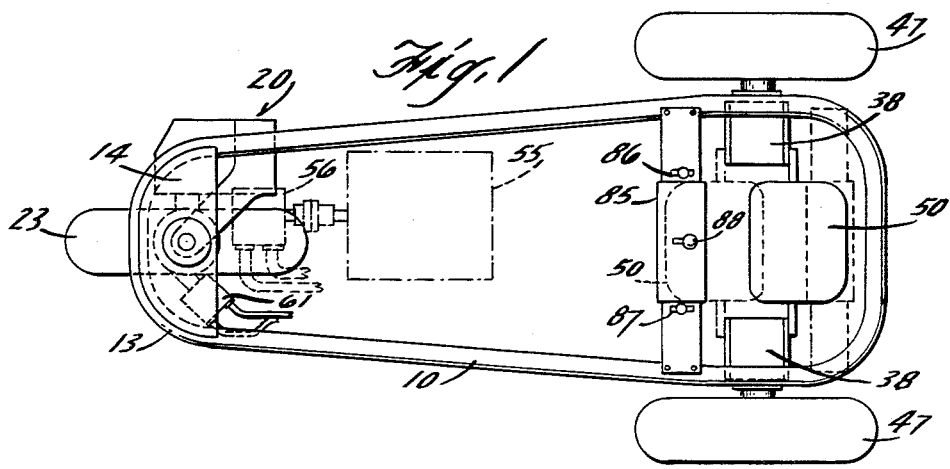
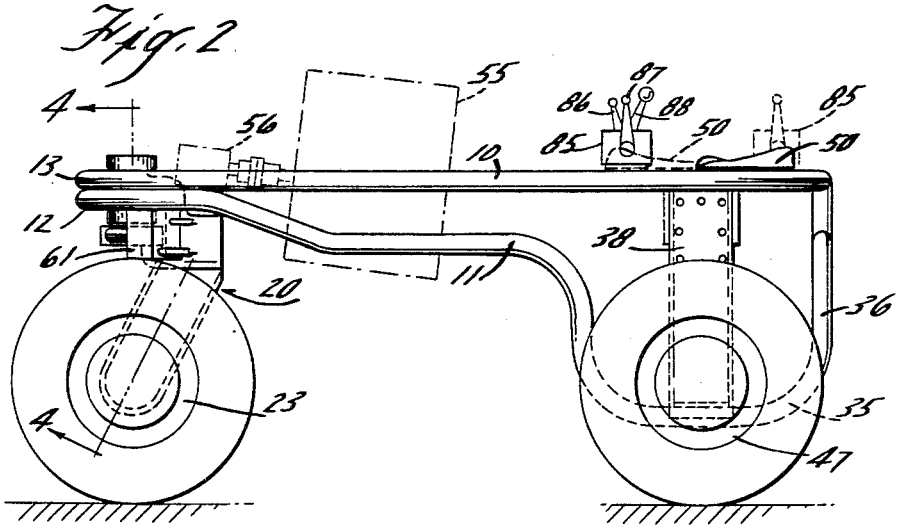
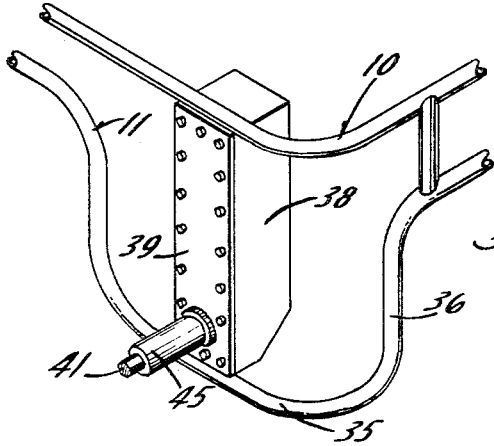
INVENTOR.
HAROLD P. GRAY
BY
Wheeler, Wheeler + Wheeler
ATTORNEYS

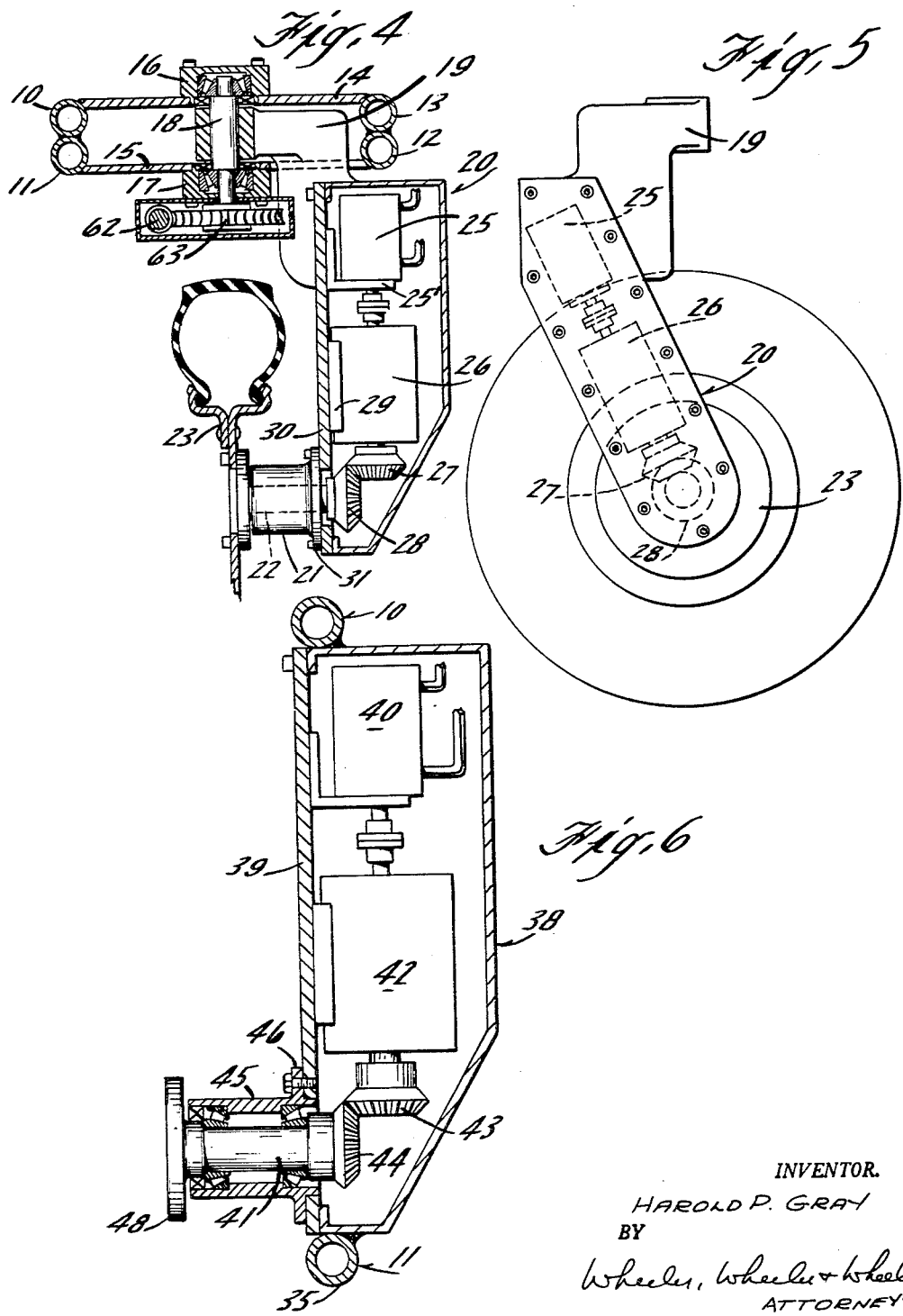

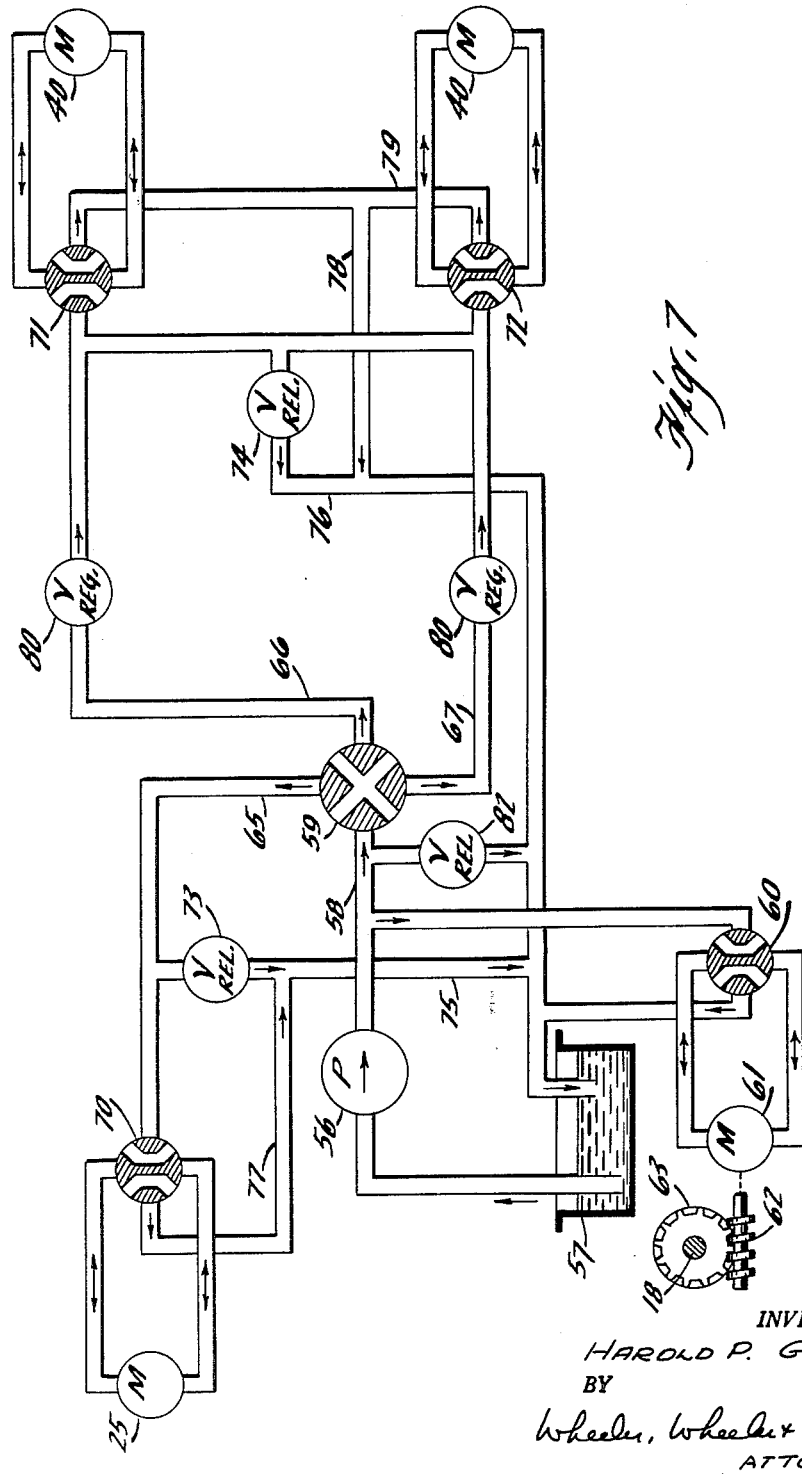

United States Patent Office 2,942,677
Patented June 28, 1960

2,942,677

TRACTOR WITH DRIVEN WHEELS INDIVIDUALLY POWERED AND MOUNTED ON TRANSMISSION HOUSINGS CONSTITUTING PART OF THE FRAME

Harold P. Gray, 522 Third St., Traverse City, Mich.

Filed Sept. 23, 1957, Ser. No. 685,738

9 Claims. (Cl. 180—26)

This invention relates to a tractor having a simplified form of frame in which upper and lower frame bars are connected at the rear of the tractor by housings which contain individual motors and drives to the respective rear wheels. The front wheel is also provided with its own motor and in this instance the wheel is entirely supported by the motor and gear train housing, the entire housing being swiveled for dirigible movement respecting the frame which, at the front of the tractor, has the upper and lower bars secured directly to each other to allow clearance for the steering movement of the front wheel.

While certain wheels have been identified as rear and front wheels respectively, the construction is such that the direction of operation can be changed at will, the operator facing in either direction and the tractor being actuated accordingly.

In the drawings:

Fig. 1 is a plan view of a tractor embodying the invention.

Fig. 2 is a view showing the tractor in side elevation.

Fig. 3 is an enlarged fragmentary detail view in perspective of the rear corner portion of the tractor.

Fig. 4 is a fragmentary detail view taken in section on the line 4—4 of Fig. 2.

Fig. 5 is an enlarged detail view of the dirigible front wheel unit in side elevation.

Fig. 6 is an enlarged detail view of the rear wheel mounting and drive in section.

Fig. 7 is a diagrammatic view of the hydraulic connections in a preferred embodiment of the invention.

At least at the front and sides of the tractor the frame comprises an upper frame bar 10 and a lower frame bar 11. The upper frame bar 10 is nearly rectangular, although its sides converge toward the front and all the corners are rounded. The lower frame bar 11 may be identical in outline in plan, although the two bars differ radically in side elevation. At the front of the tractor, the portion 12 of the lower frame bar 11 is welded directly to the corresponding portion 13 of the upper frame bar 10. The portion 13 is spanned by a gusset plate 14 and a lower plate 15 which support bearings 16 and 17 for a power driven kingpin 18.

Fastened to the kingpin 18 is a laterally and rearwardly projecting arm 19 on which housing 20 is fixed to provide a dirigible support for the bearing sleeve 21 in which the live axle 22 is mounted for the support of the front wheel 23. A motor 25 within housing 20 drives the live axle 22 through a speed reducer 26 and bevel gears 27, 28. Thus, the entire motorized drive to the front wheel 23 is mounted in or upon the housing 20. In the preferred construction shown, brackets 25' and 29 support the motor and speed reducer from the removable closure plate 30 of the housing on which the flange 31 of bearing sleeve 21 is also mounted. Thus, the entire assembly can be moved from the housing simply by taking off the cover plate 30.

Between the front and rear wheels of the tractor, the upper and lower frame bars 10 and 11 are in relatively close proximity, but at the rear of the tractor the lower frame bar 11 has a dropped portion 35. Behind this, the lower frame bar arches upwardly at 36 and is connected in any appropriate manner with the top frame bar 10.

At both sides of the tractor the space between the upper and lower frame bars is spanned by a housing 38 as best shown in Figs. 3 and 6. These housing units are comparable to those used at the front of the tractor except that they do not turn for steering. They have removable closure plates 39 on which are mounted, within the housing 38, an individual driving motor 40 which actuates the live axle 41 through gear train 42 and bevel gears 43, 44. The live axle 41 operates in suitable bearings in a bearing sleeve 45 having a flange 46 fastened to the housing cover plate 39. The wheels 47 are fastened to the flange 48 with which the live axle is provided as best shown in Fig. 6.

As in the front wheel mounting already described, the motor and transmission housing carries the bearing in which the live axle is journaled and therefore supports the tractor frame from the wheel, in addition to enclosing the motor and driving train individual to that particular wheel. In the case of the rear wheels, the housings in question also act as struts to interconnect the upper and lower bars which constitute the tractor frame.

Since the rear wheels are individually driven, there is no live axle or differential interposed between them, and there is a full clearance for a row of growing crops which may be in course of cultivation through the use of tools connected with the tractor. The clearance between the wheels may also be used to promote the operator's comfort by receiving his legs as he sits upon the seat 50. This seat is shown in Figs. 1 and 2 in a position in which the operator faces the single wheel 23 which is normally at the front of the tractor. However, the seat may be reversed as shown in dotted lines in these views, and the motors used are also reversible so that the operator can readily operate the tractor in a direction in which the steering wheel is at the rear.

In a preferred embodiment of the invention, the motors used are hydraulic. The engine may be in any desired location such as that shown at 55. It operates a pump 56 taking oil or other operating fluid from a reservoir 57 and delivering it under pressure through a line 58 which branches to supply a control valve 59 and another at 60, the latter providing reversible connections to opposite ends of a motor 61 whereof the worm shaft 62 meshes with gear 63 on the steering shaft 18 as shown in Fig. 4 and Fig. 7.

The valve 59 controls pressure lines 65, 66 and 67 leading respectively to the motor 25 which powers the steering wheel 23 and the motors 40 which power the two rear wheels 47. In each of the pressure lines supplying the three motors, there is a reversible and shut-off valve, these being shown in Fig. 7 and respectively identified by reference characters 70, 71 and 72. To accommodate and relieve pressure developed by the pump when these valves are closed, relief valves 73 and 74 are connected between the several lines and return lines 75, 76 to the reservoir. The discharge flow from the several valves 70, 71 and 72 is connected across the relief valves by lines 77, 78 and 79, respectively.

It has been found desirable to equip the pressure lines to the fluid motors which operate wheels 47 with infinitely variable flow controlling valves 80 in order that the rate of operation of the rear wheels can be equalized. If either of the rear wheels tended to operate faster than the other, there would be a constant tendency to turn the tractor.

With the valves 70, 71 and 72 open to operate the respective motors in the same direction, the operator can vary the speed of the tractor simply by manipulating the valve 59 which is also an infinitely variable valve. Since this valve may be completely closed to stop the tractor, a relief valve 82 is interposed between the pressure line 58 and the reservoir to relieve the pressure when the valve 59 is shut.

In the preferred arrangement, the several controllable valves are all located in a common housing 85 connected across the top frame member 10 and interchangeable with the seat 50 so that it will be convenient to the operator in either position of the seat. Flexible connections accommodate the change of position of the control housing 85. The several reversible valves 70, 71, 72 may all be connected for operation by a single reverse lever 86. The speed controlling valve 59 may be operated by lever 87 and steering may be done by the central lever 88 projecting from the valve housing 85.

The tractor has an exceptionally low center of gravity by reason of the construction described, and it also provides exceptional clearance for crops in a field in which it is operating. These advantages are achieved with a construction which is extremely simple and inexpensive inasmuch as the housings for the drives to the individual wheels are used as parts of the frame.

I claim:

1. In a vehicle the combination with upper and lower frame members of corresponding outline in plan, each being continuous in extent about two sides and two ends, of a plurality of supporting wheels and driving units individual to each of a plurality of said wheels, and housings for said units and extending between the upper and lower frame members and connected with both said members to constitute parts of the vehicle frame.

2. In a vehicle, the combination with a frame, of a plurality of housing members each provided with wheel bearing supports, wheels mounted on the respective supports, a motor individual to each wheel and having driving connections thereto within the respective housing member, at least two of said housing members being fixed to and constituting a part of the frame and at least one such housing member being in swiveled connection with the frame for oscillation upon a generally upright axis whereby the wheel mounted on the bearing support thereof is used in steering the vehicle, said frame comprising upper and lower frame members which are spaced at the points where the said two housing members are fixed thereto, the said two housing members being rigidly attached to the upper and lower frame members to constitute struts therebetween.

3. In a vehicle, a wheel mounting and driving device comprising a housing having a removable cover plate, a wheel bearing support mounted on the cover plate exteriorly of the housing, a driving motor and transmission operatively connecting the motor with the wheel and mounted on the cover plate and disposed interiorly of the housing.

4. The device of claim 3 in which said housing is provided with an upright kingpin, the housing being elongated in a generally upright direction and extending downwardly from said kingpin, the wheel bearing support being located remote from the kingpin and the housing as a whole being adapted for swiveling movement about the axis of the kingpin.

5. In a vehicle, a wheel mounting and driving device comprising a housing having a removable cover plate, a wheel bearing support mounted on the cover plate exteriorly of the housing, a driving motor and transmission operatively connecting the motor with the wheel and mounted on the cover plate and disposed interiorly of the housing, and a vehicle frame comprising spaced members to which said housing is connected and between which it extends as a frame strut.

6. A vehicle of the character described comprising the combination with upper and lower frame members, each substantially continuously and unitarily providing two side and two end portions, said members being of corresponding outline in plan, the upper of said members being substantially horizontal and the lower being proximate and connected to the upper at one end of the vehicle and being widely spaced downwardly therefrom at the other end of the vehicle, together with gear housings constituting parts of said frame and connecting said members at laterally opposite points where said members are spaced, wheels having mountings projecting from respective housings, and driving connections to the respective wheels including gear trains in the respective housings and motors having operative driving connection with respective wheels through said gear trains.

7. The vehicle of claim 6 in further combination with means spanning said members at the end of the vehicle at which they are proximate and providing a steering bearing, a kingpin oscillatable in the bearing, and a steering wheel and driving unit connected through said kingpin with the frame, said unit including a wheel bearing support, a driving motor individual to the wheel and driving connections from the motor to the wheel.

8. A vehicle of the character described comprising the combination with upper and lower frame members having laterally spaced sides and of corresponding outline in plan, said members being proximate each other at one end of the vehicle and being widely spaced vertically at the other end of the vehicle, means spanning said members at the end of said vehicle at which they are proximate and providing a steering bearing, a kingpin oscillatable in the bearings, and a steering wheel and driving unit connected through said kingpin with the frame, said unit including a wheel bearing support, a driving motor individual to the wheel and driving connection from the motor to the wheel, together with means providing wheels beneath that portion of the vehicle at which said frame members are widely spaced vertically, said last mentioned means comprises strut members connected respectively with the upper and lower frame members and extending vertically therebetween, wheel bearing supports mounted on respective strut members, wheels mounted on the bearing supports, driving motors individual to the respective wheels and mounted on the strut members and driving connections from respective motors to said respective wheels and mounted on the strut members, each such strut member, motor, driving connections and wheel constituting a unit independent of the upper and lower frame members aforesaid.

9. A vehicle comprising a frame having supporting and steering wheels, a strut member providing the bearing supports for each wheel and having a driving motor and driving connection individual to that wheel mounted upon it, at least one such strut member being in swiveled connection with the frame, whereby its wheel constitutes a steering wheel, said frame is provided with an operator's seat and seat support spanning the frame between two of said strut members and with a control box for said motors, the seat and control box are reversibly interchangeable whereby the operator may face in either direction respecting the vehicle frame and its wheel used in steering.

References Cited in the file of this patent

UNITED STATES PATENTS

| 1,052,829 | Karminski et al. | Feb. 11, 1918 |
| 1,609,044 | Williams | Nov. 30, 1926 |
| 1,840,407 | Norman | Jan. 12, 1932 |
| 2,272,603 | Ellis | Feb. 10, 1942 |
| 2,325,396 | Hastings | July 27, 1943 |
| 2,586,273 | Steven | Feb. 19, 1952 |
| 2,706,008 | Voigt | Apr. 12, 1955 |
| 2,796,140 | Knolle | June 18, 1957 |

FOREIGN PATENTS

| 1,097,127 | France | Feb. 9, 1955 |